United States Patent [19]

Fischer

[11] Patent Number: 4,717,249

[45] Date of Patent: Jan. 5, 1988

[54] DIVING MASK WITH AUXILIARY LENS

[76] Inventor: Bernard D. Fischer, 394 South St., Rochester, Mich. 48063-4789

[21] Appl. No.: 871,317

[22] Filed: Jun. 6, 1986

[51] Int. Cl.$^4$ ........................... G02B 5/04; G02C 7/14
[52] U.S. Cl. ........................................ 351/43; 350/286
[58] Field of Search ..................... 351/43, 47, 57, 173; 2/9, 431, 444, 447; 350/418, 436, 286

[56] References Cited

FOREIGN PATENT DOCUMENTS 783315  9/1957  United Kingdom ................ 351/175

Primary Examiner—Bruce Y. Arnold
Assistant Examiner—Jay P. Ryan
Attorney, Agent, or Firm—Reising, Ethington, Barnard, Perry & Milton

[57] ABSTRACT

A prism lens attached to the window of a diving mask at a position laterally removed from the normal line of sight through the window and having a planar surface (22) and a spaced spherical surface (24) with a chord (26) of the spherical surface (24) disposed at an acute angle relative to the planar surface (22) for magnifying and bending the line of sight through the prism lens means (20) to allow viewing therethrough at an acute angle between the eye and prism lens means (20).

11 Claims, 3 Drawing Figures

DIVING MASK WITH AUXILIARY LENS

TECHNICAL FIELD

The subject invention relates to a diving mask assembly of the type used by underwater divers. The assembly includes a prism lens means to allow people, and particularly far-sighted people, to better see watches, gauges and the like.

BACKGROUND ART

There are diving mask assemblies known in the prior art which use lenses to aid viewing of watches, gauges and the like. One type of such a mask assembly is described in U.S. Pat. No. 3,787,113 and includes a mounting means for mounting a pair of corrective eyeglasses within the mask. The eyeglasses are removably and pivotally carried by the mounting means at the upper portion of the mask directly in the viewer's line of sight. Other types of underwater vision devices disclose corrective lenses supported by goggle-type support frames to be used primarily for recreational or competitive swimming and include lenses disposed directly in the viewer's line of sight, e.g., U.S. Pat. Nos. 4,373,788 and 3,944,345. There are add-on lenses as shown in U.S. Pat. No. 2,770,168, but distortion may occur when the wearer views objects laterally or downwardly removed from the normal line of sight. Lenses disclosed in the prior art do not compensate for this displaced line of sight.

STATEMENT OF INVENTION AND ADVANTAGES

The subject invention relates to a diving mask assembly comprising a face engaging support means and a diving mask window supported by the support means for viewing through the mask. The assembly includes a prism lens means attached to the window at a lateral position removed from the normal line of sight through the window. The prism lens means comprises a planar surface and a spaced spherical surface with the chord of the spherical surface disposed at an acute angle relative to said planar surface for bending the line of sight through the prism lens means to allow viewing therethrough at an acute angle between the eye and the prism lens means with minimal distortion. The present invention eliminates this problem and provides a magnified unobstructive view of watches, gauges and the like viewed at a lateral position removed from the normal line of sight. Further, the present invention incorporates lens means which occupy only a small portion of the available viewing surface of the mask so as to avoid obstruction of the normal field of vision.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
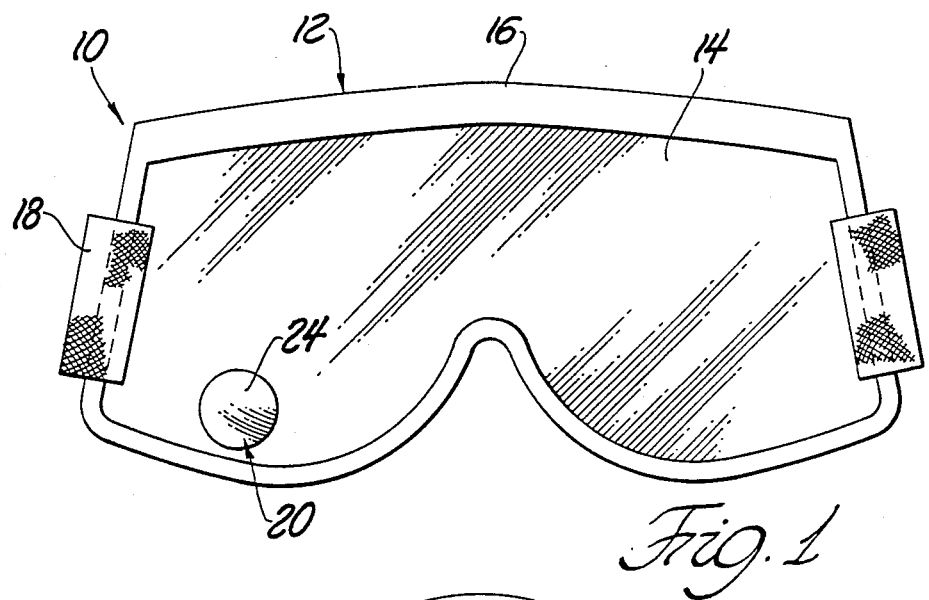
FIG. 1 is a front view of the diving mask assembly.

A diving mask assembly constructed in accordance with the subject invention is generally shown at 10.

The diving mask assembly 10 includes a face-engaging support means 12 supporting a window 14. The support means 12 includes a window support frame 16 and straps 18 to hold the support means 12 secure upon the face of the wearer.

The assembly includes a prism lens means generally indicated at 20. The prism lens means 20 may be attached to either the inner or outer surface of the mask by clear glue or any other suitable adhesive. The prism lens means 20 is located in a position laterally removed from the normal line of sight of the viewer. Preferably, the prism lens means 20 is located in a position downwardly and outwardly from the line of sight through the window. The wearer may bring a wrist to a position laterally of the mask to view watches or gauges on the wrist as the line of sight from the eye is bent through the prism lens to the watch or gauge.

Figure 2:
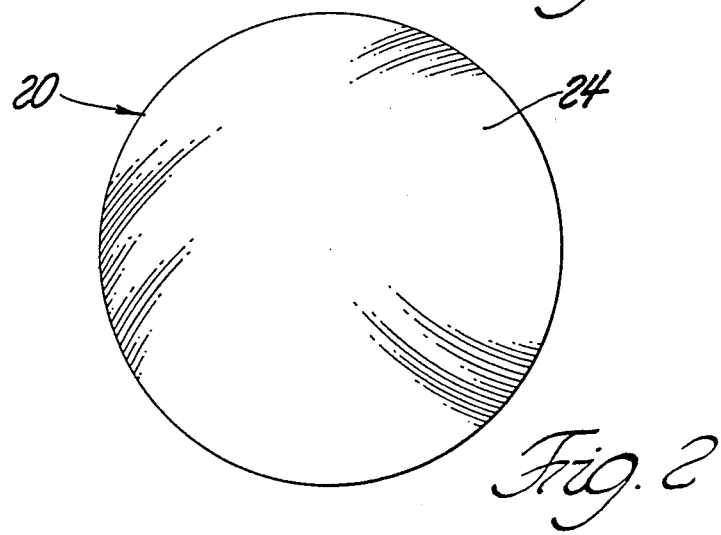
FIG. 2 is a top view of the prism lens means.
Figure 3:
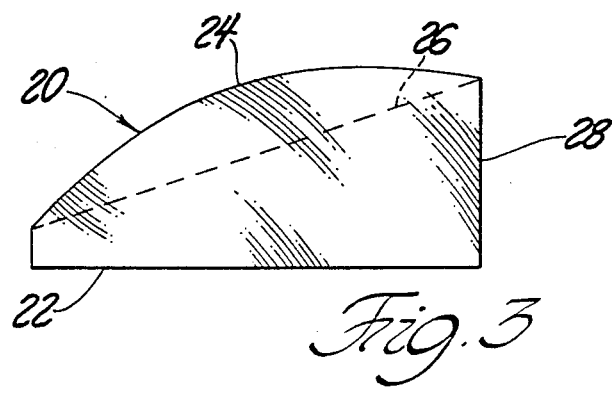
FIG. 3 is a side view of the prism lens means.

As more particularly shown in FIGS. 2 and 3, the prism lens 20 includes a planar surface 22 at one end and a convex spherical surface 24 at the other end and spaced from the planar surface 22. The spherical surface 24 has a chord 26 which forms an acute angle with the planar surface 22. The planar surface 22 is spaced from the convex surface 24 by an exterior cylindrical surface 28. Thus, the convex spherical surface 24 with its chord forming an acute angle with the planar surface 22 magnifies and bends the normal line of sight.

The invention has been described in an illustrative manner, and it is to be understood that the terminology which has been used is intended to be in the nature of words of description rather than limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A diving mask assembly (10) comprising: a face-engaging support means (12), a diving mask window (14) supported by said support means for viewing through said mask, said assembly characterized by: a prism lens means (20) attached to said window at a position laterally removed from the nomral line of sight through the window and having a planar surface (22) and a spaced spherical surface (24) with a chord (26) of the spherical surface (24) disposed at an acute angle relative to said planar surface (22) for magnifying and bending the line of sight through the prism lens means (20) to allow viewing therethrough at an acute angle between the eye and the prism lens means (20).

2. An assembly as set forth in claim 1 further characterized by said planar surface (22) being circular and secured to said window (14).

3. An assembly as set forth in claim 2 further characterized by said exterior of said prism lens means (20) being cylindrical between said planar surface (22) and said spherical surface (24).

4. An assembly as set forth in claim 3 further characterized by said spherical surface (24) being convex.

5. A prism lens (20) as set forth in claim 4 further characterized by said prism lens (20) being adhesively attached to said mask window (14).

6. A prism lens (20) set forth in claim 5 further characterized by said adhesive being a clear transparent glue or any other suitable adhesive.

7. A diving mask assembly as set forth in claim 6 further characterized by said face-engaging support means (12) including a window support frame (16) and a strap (18) for holding said face-engaging means (12) to a wearer's face.

8. A prism lens (20) for attachment to a window of a diving mask at a position laterally removed from the normal line of sight through the mask, said prism lens means (20) comprising a planar surface (22), and a spherical surface (24) spaced from said planar surface (22), said spherical surface (24) having a chord (26) disposed at an acute angle relative to said planar surface (22) for magnifying and bending the line of sight through the prism lens to allow viewing therethrough at an acute angle relative to the normal line of sight between the eye and the prism lens (20).

9. A prism lens (20) as set forth in claim 8 further characterized by said planar surface (22) being circular.

10. A prism lens (20) as set forth in claim 9 further characterized by said prism lens (20) being cylindrical between said prism lens surface (22) and said spherical surface (24).

11. A prism lens (20) as set forth in claim 10 further characterized by said spherical surface (24) being convex.

* * * * *